Figure 1:
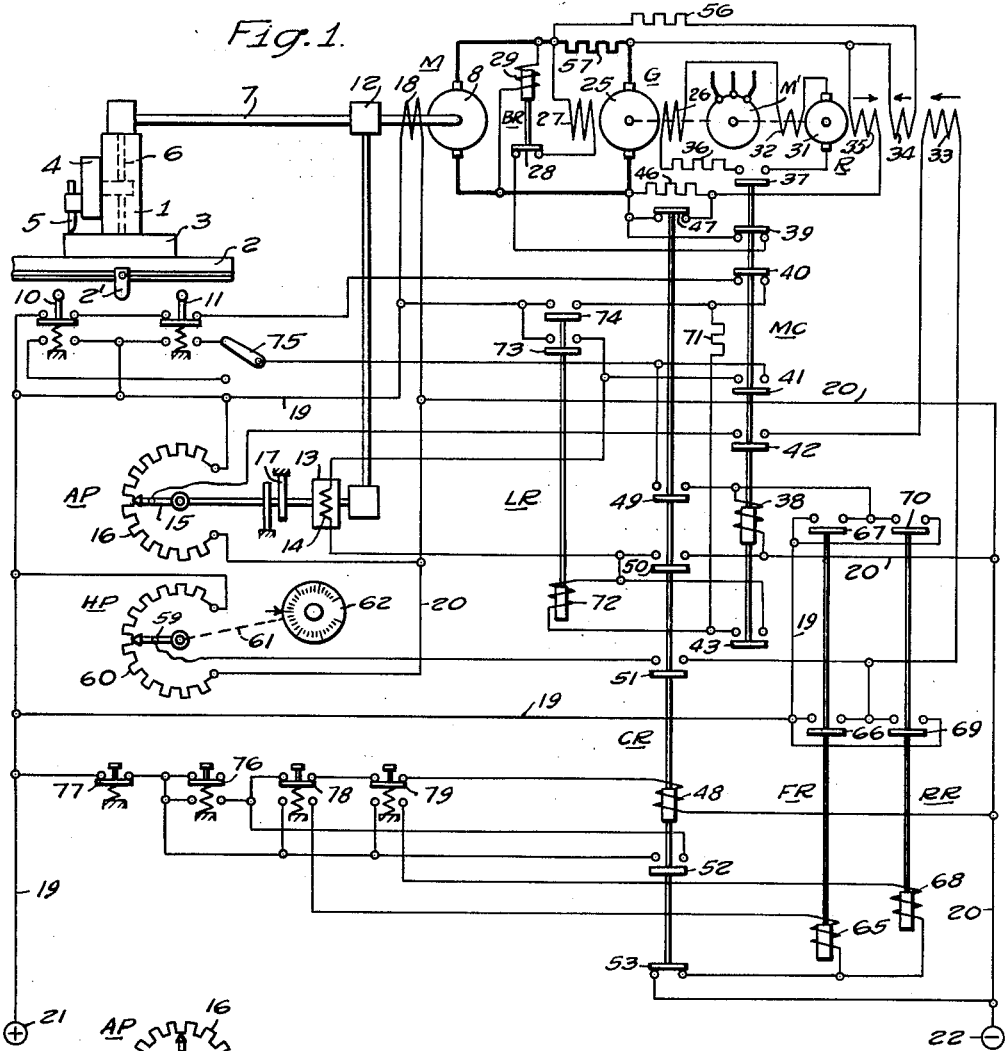

Oct. 25, 1949.    G. E. KING    2,486,295

FEED CONTROL SYSTEM

Filed Jan. 25, 1947

INVENTOR
George E. King.
BY
ATTORNEY

Patented Oct. 25, 1949

2,486,295

UNITED STATES PATENT OFFICE 2,486,295

FEED CONTROL SYSTEM

George E. King, Swissvale, Pa., assignor to Westinghouse Electric Corporation, East Pittsburgh, Pa., a corporation of Pennsylvania Application January 25, 1947, Serial No. 724,292

9 Claims. (Cl. 318—142)

My invention relates to electric drive systems of the variable voltage type for fabricating machinery such as machine tools, and concerns itself particularly with the control of intermittent feed motion in such machinery.

The need for an electric drive of the variable voltage type arises if a continuous speed variation of the drive over a wide range of speed values is desired. For example, there are horizontal combination shaping, milling, boring and drilling machines in which a common feed motor is used for the different operations to be performed by the machine. When milling, boring or drilling, a continuous type feed is used, while for shaping an intermittent type feed is required. In order to eliminate or reduce the number of gear changes in the feed system, a wide speed range drive is required, and this requirement can be met by a variable voltage system preferably of the type in which the drive motor is energized from a constant-speed main generator whose field excitation is controlled by a regulating generator of the amplifying type.

In order to control such a variable voltage drive for intermittent feed, a geared-type limit switch has been used. The function of the limit switch is to stop the feed motor after it has completed a number of revolutions determined by the selected setting of the limit switch. A limit switch of this particular type is a rather expensive apparatus because it is mechanically intricate, and it must be located on the machine so that it can be geared to the feed motor.

It is one of the main objects of my invention to provide a feed control system for variable voltage drives which readily permits locating the feed adjustment dial or the like selector means at a place remote from the machine, for instance in an operator's station.

Another main object of my invention is to provide a feed control apparatus for purposes of the kind above mentioned that permits the use of a simpler and more reliable apparatus than the special geared type limit switch heretofore customary.

In order to achieve these objects, I control the variable voltage drive by means of two adjustable rheostats which form part of an electric network, for instance of the bridge type. This network has a balanceable circuit branch for providing a reversible control voltage for the control of the variable voltage drive. The control voltage is zero and hence causes no movement of the feed motor when the respective adjustments of the two rheostats have a given neutral relation, for instance when the appertaining rheostat slide contacts are in positional agreement with each other. When the adjustment of the rheostats departs from such agreement, the circuit branch imposes a voltage on the drive system and causes the motor to run. One of the two rheostats is provided with calibrated manual means to be set by the operator, while the other rheostat is mechanically connected to the drive motor so as to perform a follow-up motion in the direction required to establish agreement between the adjustments of the two rheostats. As soon as this agreement is reached, the control voltage becomes again zero so that the drive motor is stopped.

According to another feature of my invention, I interpose a coupling between the drive motor and the rheostat to be driven thereby and control the coupling to close at a predetermined moment relative to the operating cycle of the machine. The control of the coupling is preferably effected by limit contacts and may include a selector switch which permits obtaining the feed motion either at the beginning of the forward stroke or at the beginning of the reverse stroke of the machine.

Figure 2:
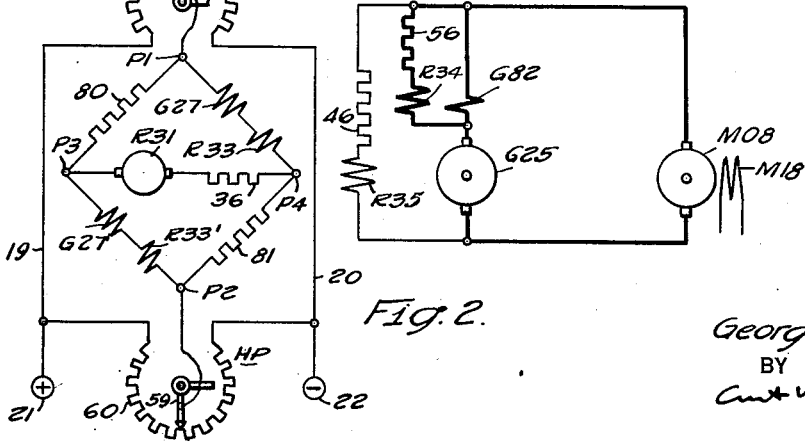

The foregoing and other objects and features of my invention will be apparent from the following description of the embodiments illustrated in the drawing, in which:

Figure 1 represents diagrammatically the variable voltage drive for a machine tool; while Fig. 2 is a straight line circuit diagram of a modified form of such a machine tool drive.

In Fig. 1, the stationary structure of the machine tool is denoted by 1. The machine has horizontally reciprocable bed 2 to accommodate a workpiece 3 and a vertically movable ram 4 provided with a carrier for the tool 5. Feed screws such as the one denoted by 6 serve to move the ram 4 up and down and are driven through a shaft 7 from the armature 8 of a direct-current motor M. The bed 2 is provided with a cam 2' for actuating two limit switches 10 and 11 at the respective ends of the bed strokes.

A gear box 12 connects the shaft 7 with an electro-magnetic coupling 13 which is closed only when the appertaining solenoid coil 14 is energized. The coupling 13 drives the slide member 15 of a potentiometric rheostat AP. The member 15 is in engagement with the appertaining potentiometric resistor 16 and is biased by springs 17 which tend to hold it in the illustrated zero position. Hence, when the coupling 13 is closed, the member 15 is driven to move in one or the other direction away from the zero position in accordance with the feed motion of the ram 4. When thereafter the coupling 13 is deenergized and opens, the member 15 is reset to the illustrated zero position due to the biasing force of springs 17.

The field winding 18 of motor M receives constant direct-current excitation from buses 19 and 20 which are connected to respective terminals 21 and 22. Any suitable source of substantially constant direct-current voltage may be connected to the terminals 21 and 22, although it is preferred to use an exciter (not illustrated) which is driven at constant speed together with the main generator G referred to presently.

The armature 8 of motor M is energized by adjustable voltage from the armature 25 of a main generator G which has two field windings denoted by 26 and 27. Field winding 26 represents the main control element of the generator G, while field winding 27 provides a suicide field during stopping and reversing intervals. The suicide field winding 27 is connected across the main generator armature under control by the contacts 28 of a brake relay BR whose coil 29 is also connected across the generator armature 25. The relay BR operates as a voltage relay. It is normally energized to open the contact 28 when the generator voltage exceeds a given low value and permits the contact 28 to apply the suicide field when the generator voltage becomes too low in order to then prevent the motor M from creeping by eliminating the residual magnetism in the field system of generator G.

The excitation for the main field winding 26 of generator G is supplied from the armature 31 of a regulating generator R. This generator has four field windings denoted by 32, 33, 34 and 35, respectively. Field winding 32 is connected to the armature 31 in order to provide self-excitation. The armature circuit includes a calibrating resistor 36 and is controlled by the contact 37 of a main contactor MC whose control coil 38 actuates also five additional contacts denoted by 39 through 43, respectively. The resistance line of the self-excited field winding 32 is so rated, by calibration of the resistor 36, that this line coincides approximately with the air gap line or no-load saturation characteristic of the regulating generator R; and this generator operates normally within the unsaturated and substantially linear portion of its magnetic characteristic. Under these conditions, the field excitation needed in the regulating generator R in order to maintain its desired output voltage is substantially furnished by the self-excited field winding 32 so that the other three field windings 33, 34 and 35 are only called upon to provide the controlling or corrective stimulation needed to change the output voltage to a higher or lower value. In this manner, the regulating generator R operates as a highly sensitive amplifier at an extremely high rate of amplification. It will be understood, however, that other available types of amplifying generators known for similar purposes may be employed instead of the one just described.

The field winding 35 in generator R is connected across the main generator armature 25 in series with a calibrating resistor 46 which is shown to be shorted by the contact 47 of a control relay CR whose coil 48 operates also the contacts denoted by 49, 50, 51, 52, 53.

The field winding 34 is connected in series with a calibrating resistor 56 across a series resistor 57 located in the armature circuit of motor M.

The field winding 33 of generator R serves to provide this generator with control excitation in order to cause the armature 31 to generate the proper field excitation needed for the main generator G to operate the motor M at the desired speed. The field winding 35, excited in accordance with the armature voltage of generator G, provides an anti-hunt stimulus and operates in opposition to the control field winding 33. The field winding 34, whose excitation is proportional to the IR drop in the armature circuit of motor M, is connected to act cumulatively with respect to control field winding 33. The field excitation of the voltage measuring field 35 is recalibrated by means of the contact 47 depending upon whether the system is set for continuous or intermittent feed. The calibration is such that when the system is set for continuous feed or traversing, the two field windings 34 and 35 produce a resultant field in the generator R which is proportional to the counter-electromotive force of the motor M. As a result, the motor speed is caused to remain constant at the desired value.

The control field 33 has one terminal connected to the slide contact 15 of the potentiometric rheostat AP under control by the contact 42 of contactor MC. The other terminal of the control field winding 33 is connected, through contact 51 of contactor CR, to the slide member 59 of another potentiometric rheostat HP whose resistor is denoted by 60. The member 59 is connected by a transmission 61 to a dial 62. This dial is to be set by the operator. It is calibrated in inches of feed with a zero center and may be located remote from the machine. The selected setting of the dial 62 determines the direction and amount of feed to be performed by the drive system. The resistors 16 and 60 are connected in parallel relation to each other across the constant buses 19 and 20. This rheostat arrangement represents a bridge circuit whose balanceable branch extends between the slide members 15 and 59 and includes the control field winding 33. When the member 59, by means of the dial 62, is set into the illustrated zero position, while the member 15 is likewise held in its zero position under the bias of springs 17, the bridge network is balanced so that no voltage is impressed across the control field winding 33. When the rheostat members 15 and 59 are displaced either way from the respective zero positions but are in positional agreement with each other, the voltage across rheostat members 15 and 59 is likewise zero so that the control field winding 33 receives no excitation. However, when the two rheostat members 15 and 59 are differently deflected from the respective zero positions, a finite voltage appears across field winding 33. The polarity and magnitude of this voltage are in accordance with the direction and extent of the departure from positional agreement between the two rheostat members. The excitation then effective in winding 33 of regulating generator R controls the main generator to operate the motor M. With coupling 13 then closed, the member 15 in rheostat AP is thus driven in the direction required to reestablish the positional agreement. In consequence, the voltage imposed on the control field winding 33 gradually decreases until it becomes zero at the moment when the rheostat member 15 assumes the position indicated by the chosen setting of the rheostat member 59. At that moment the control stimulus in the regulating generator ceases so that the drive system is stopped.

The controls for the drive include further two relays FR and RR for controlling the traversing operation of the machine in the forward and reverse direction, respectively. The coil 65 of relay FR controls two contacts 66 and 67. The coil 68 of relay RR serves to control two contacts 69 and 70. A limit relay LR with a coil 72 and two contacts 73, 74, a feed selector switch 75 and four push button contacts 76, 77, 78 and 79 are provided for the purposes referred to in the following description of the operation of the system.

When the main generator and regulating generator are driven from the appertaining constant speed motor M' and with terminals 21 and 22 energized, the feed motion can be started by depressing the start button 76. This has the effect of energizing coil 48 of relay CR. Contact 52 of relay CR completes a holding circuit around the start button 76 so that the relay remains picked up when thereafter the start button 76 is released. Contacts 49, 50 and 51 of relay CR close and set up the circuits required for incremental feed. When the ram 4 is in a central position, the cut limit switch 11 and the return limit switch 10 are in the illustrated position. The contact of the feed selector switch 75 is shown to be connected with the cut limit switch 11 in order to cause the feed to occur at the end of the cut stroke. If it is desired to have the feed occur at the end of the return stroke, it is merely necessary to place switch 75 into its other position.

Under the mentioned conditions, the coil 72 of limit relay LR is energized in the circuit 20—50—72—71—74—19. Relay LR closes contacts 73 and 74. As a result, the clutch solenoid 14 is energized in the circuit 20—50—14—73—19 and couples the rheostat member 15 to the feed motor M. At the end of the cut stroke the cut limit switch 11 is operated. Its make contact closes for coil 38 of contactor MC the energizing circuit 19—11—75—49—38—20. Contact 37 of contactor MC now completes the field circuit of the main generator G. Contact 41 closes a self-holding circuit for the clutch solenoid 14, contact 42 closes the circuit of field winding 33, and contact 43 short-circuits the coil 72 of the limit relay LR, thus causing this relay to drop out.

Assuming that the manually operated rheostat HP was previously adjusted for ⅛ inch feed in the forward direction, a current will now flow in the control field winding 33 causing the control generator R to build up an armature voltage which excites the main generator field 26. The generator armature voltage builds up and causes the motor M to operate in the direction to feed forward. Since the potentiometric rheostat AP is geared to the feed motor through the magnetic clutch 13, the arm 15 moves toward positional agreement with the member 59 of the manually operated rheostat HP. At the moment this agreement is reached, the voltage across the control field winding 33 is again zero. During the feed motion, the regulating generator R forces the main generator voltage gradually down to zero, thus stopping the feed motor 8.

Thereafter the ram 2 is caused to reverse. Hence, the limit switch 11 closes its make contact so that the coil 38 of contactor MC and the solenoid 14 of the clutch 13 become deenergized. The rheostat member 15 is then immediately reset to the zero position by the force of springs 17 and becomes ready for the next feed.

The above-described feeding performance can be interrupted at any time by opening the stop contact 77 which deenergizes the coil 48 and causes the control relay CR to drop out.

When the motor M is used for traversing, the push button 78 is depressed for forward operation and the push button 79 for reverse operation. When button 78 is depressed the coil 65 of relay FR is energized so that contacts 66 and 67 become closed. Contact 67 closes for coil 38 of contactor MC the circuit 19—67—38—20. Contactor MC picks up and applies excitation to the control field 33 of regulating generator R in the circuit 19—66—33—42—15—16—20. The exciting voltage across field winding 33 is now determined by the voltage drop across the potentiometer AP. Since the magnetic clutch 13 remains deenergized, the rheostat member 15 does not move and the motor M is accelerated to maximum speed. This speed is reached when the combined effects of field windings 34 and 35 neutralize the field winding 33. The forward traversing motion is stopped when the button 78 is released. For traversing in the reverse direction the button 79 is actuated and causes the relay RR and the contactor MC to pick up. The control field winding is then effective in the same manner as just described except that its exciting voltage is applied with reversed polarity in order to make the motor M run in the opposite direction.

The embodiment represented by Fig. 2 is in many respects similar to the one described above with reference to Fig. 1 except that the field and rheostat circuits are designed in a different manner. For that reason, only the modified circuits are shown in Fig. 2; and a straight line representation of these circuits has been chosen because their nature would otherwise not be as clearly apparent. In order to facilitate a comparison of Fig. 2 with Fig. 1, the reference characters used in Fig. 2 are identical with those of functionally equivalent elements of Fig. 1, except that in Fig. 2 the prefixes M, G and R are added to the armatures and field windings of the respective machines M, G and R in order to make the electromagnetic relation of the appertaining machine parts also apparent.

According to Fig. 2, the feed motor has its armature M08 energized by variable voltage from the armature G25 of the main generator in series with an interpole or compensating field winding G82 of the main generator. Connected across the field winding G82 is the IR drop-compensating field winding R34 of the regulating generator in series with the calibrating resistor 56. Since the voltage drop across the field winding G82 is proportional to the IR drop in the armature circuit, the excitation of field winding R34 is equivalent to that of field winding 34 in Fig. 1. Connected across the motor armature M08 is the voltage-responsive field winding R35 of the regulating generator in series with the calibrating resistor 46, this connection being likewise similar to that of the field winding 35 in Fig. 1.

According to Fig. 2 the main field winding of the main generator has two sections denoted by G27 and G27' which are connected in opposite circuit branches of a bridge network extending between the terminal points P1, P3, P2 and P4. The control field winding of the regulating generator H is likewise composed of two sections R33 and R33' which are series connected with the main generator winding sections G27 and G27' in the same respective branches of the network. The remaining two branches contain resistors 80 and 81, respectively. The armature R31 of the regulating generator and a calibrating resistor 36 are series connected between the terminal points P3 and P4 of the network. The two other terminal points P1 and P2 are connected across the rheostat members 15 and 59 of the respective rheostats AP and HP. The appertaining rheostat resistors 16 and 60 are connected in parallel across buses 19 and 20 energized by constant direct-current voltage from terminals 21 and 22, respectively.

The excitation of the sections R33 and R33' of the control field winding in the regulating generator is provided by the voltage drop between the rheostat members 15 and 59 and is cumulative in these two sections. When the two rheostat members 15 and 59 deflect from positional agreement with each other, this voltage drop assumes a finite value and a polarity determined by the direction of that deflection. The control field in the regulating generator then causes the appertaining armature R31 to generate an amplified control voltage which cumulatively energizes the two winding sections G27 and G27' of the main generator so that the resultant effect, in principle, is similar to the control performance of the system described above with reference to Fig. 1.

It will be noted, however, according to Fig. 2, that the control field excitation of the regulating generator passes also through the winding sections G27 and G27' of the main generator and that the excitation of the main winding sections G27 and G27' is simultaneously effective in the control field windings R33 and R33' of the regulating generator. This has the effect of considerably reducing the time constant of control so that the system is distinguished by a more rapid response and an increased stability from hunting tendencies.

It will be understood by those skilled in the art that the invention permits of modifications and alterations other than those specifically described and illustrated without departing from the principles of the invention and within the essential features of the invention as set forth in the claims annexed hereto.

I claim as my invention:

1. A feed control system for fabricating machinery, comprising a direct-current feed motor, a main generator connected to said motor for providing energization therefor and having field means for controlling said energization, a regulating generator having an armature connected to said main generator and having a control field winding for controlling said field means, a bridge circuit having two adjustable rheostats and a balanceable branch for providing a reversible control voltage dependent in polarity and magnitude upon the departure of said rheostats from a given adjustment relative to each other, said branch being connected to said control field winding, calibrated selector means for adjusting one of said rheostats in accordance with desired amounts of feed, transmission means for connecting said other rheostat with said feed motor so as to cause said other rheostat to perform a follow-up adjustment in the direction required to establish said given relative adjustment, control means to connect and disconnect said transmission means from said other rheostat, and biasing means for returning said other rheostat to zero feed adjustment when said transmission means are disconnected.

2. A feed control system for fabricating machinery, comprising a direct-current feed motor, a main generator connected to said motor for providing energization therefor and having field means for controlling said energization, a regulating generator having an armature connected to said main generator and having a control field winding for controlling said field means, a bridge circuit having two adjustable rheostats and a balanceable branch for providing a reversible control voltage dependent in polarity and magnitude upon the departure of said rheostats from a given adjustment relative to each other, said branch being connected to said control field winding, calibrated selector means for adjusting one of said rheostats in accordance with desired amounts of feed, a coupling disposed between said feed motor and said other rheostat for causing the latter to be adjusted by said motor in the direction required to establish said given relative adjustment, limit switch means connected to said coupling for causing it to close for initiating the feed, and biasing means associated with said other rheostat for returning it to a given zero feed adjustment when said coupling is released.

3. A feed control system for fabricating machinery, comprising a variable voltage drive having a drive motor and generator means for providing reversible energization for said motor, a control circuit appertaining to said generator means for controlling the latter, a bridge circuit having two adjustable rheostats provided with respective movable adjusting members connected to said control circuit for providing the latter with reversible control voltage whose polarity and magnitude are dependent on the departure of said members from positional agreement with each other, selector means connected with one of said members for placing it in a position indicative of the desired amount of feed, coupling means for connecting said other member with said feed motor so as to move said other member in the direction required to establish said positional agreement when said coupling means is closed, control means for controlling the coupling means to open and close, and biasing means connected with said other rheostat member for returning it to a given zero feed position of adjustment when said coupling is open.

4. A feed control system for fabricating machinery, comprising a variable voltage drive having a drive motor and generator means for providing reversible energization for said motor, said generator means having a field circuit for controlling said energization, a direct-current bridge circuit having two rheostats equipped with respective movable adjusting members and having output points connected to said field circuit to impose on the latter a control voltage whose polarity and magnitude depend upon the direction and extent of departure of said members from positional agreement with each other, selector means connected with one of said members for placing it in a position indicative of the desired amount of feed and having a position indicative of zero feed, coupling means for connecting said other member to said feed motor for moving said other member in the direction required to establish said positional agreement when said coupling means is closed, limit switch means connected with said coupling means for controlling the closing of the latter, and biasing means connected with said other member and tending to hold it in a fixed position corresponding to said zero-feed position of said one member when said coupling means is open.

5. A feed control system for reciprocable machine tools, comprising a direct-current feed motor, a main generator connected to said motor for providing energization therefor and having field means for controlling said energization, a regulating generator having an armature connected to said main generator and having a control field winding for controlling said field means, a circuit having two adjustable rheostats and a balanceable branch for providing a reversible control voltage dependent in polarity and magnitude upon the departure of said rheostats from a given adjustment relative to each other, said branch being connected to said control field winding, calibrated selector means for adjusting one of said rheostats in accordance with desired amounts of feed, transmission means for connecting said other rheostat with said motor so as to cause said other rheostat to be adjusted in the direction required to establish said given relative adjustment, a limit switch to be actuated at one end of the machine stroke, circuit means disposed between said limit switch and said transmission means for controlling said transmission means to connect said other rheostat with said motor only when said one limit switch is actuated, and biasing means for returning said other rheostat to a given adjustment when said transmission means are disconnected.

6. A feed control system for reciprocable machine tools, comprising a direct-current feed motor, a main generator connected to said motor for providing energization therefor and having field means for controlling said energization, a regulating generator having an armature connected to said main generator and having a control field winding for controlling said field means, a circuit having two adjustable rheostats and a balanceable branch for providing a reversible control voltage dependent in polarity and magnitude upon the departure of said rheostats from a given adjustment relative to each other, said branch being connected to said control field winding, calibrated selector means for adjusting one of said rheostats in accordance with desired amounts of feed, transmission means for connecting said other rheostat with said motor so as to cause said other rheostat to be adjusted in the direction required to establish said given relative adjustment, a control circuit disposed for controlling said transmission means, two limit switches to be actuated at the respective ends of the reciprocating travel, a selector switch attached to said control circuit and to said limit switches for selectively connecting said control circuit with one of said respective limit switches so that said transmission is caused to connect said other rheostat with said motor only when the selected limit switch is actuated, and biasing means for returning said other rheostat to a given adjustment when said transmission means are disconnected.

7. For a machine tool having a reciprocable structure, a feed control system comprising a variable voltage drive having a drive motor and generator means for providing reversible energization for said motor, a control circuit appertaining to said generator means for controlling the latter, a bridge circuit having two adjustable rheostats provided with respective movable adjusting members connected to said control circuit for providing the latter with reversible control voltage whose polarity and magnitude are dependent on the departure of said members from positional agreement with each other, selector means connected with one of said members for placing it in a position indicative of the desired amount of feed, coupling means for connecting said other member with said feed motor so as to move said other member in the direction required to establish said positional agreement when said coupling means is closed, an electric circuit for controlling said coupling to open and close, two limit switches to be actuated at the respective ends of the reciprocating travel, a selector switch disposed between said latter circuit and said two limit switches for selectively connecting said latter circuit with one of said limit switches so that said coupling is caused to close only when the selected limit switch is actuated, and biasing means connected with said other rheostat member for returning it to a given position of adjustment when said coupling is open.

8. For use with fabricating machinery having a reciprocating relative movement between tool and work piece, a feed control system comprising a feed motor, current supply means connected to said motor for providing energization therefor and having voltage-responsive control means for controlling said energization, a circuit having two adjustable rheostats and having a balanceable branch connected to said control means for providing said control means with reversible control voltage dependent in polarity and magnitude upon the departure of said rheostats from a given adjustment relative to each other, selector means for adjusting one of said rheostats in accordance with desired amounts of feed, transmission means for connecting said other rheostat with said motor so as to cause said other rheostat to be adjusted in the direction required to establish said given relative adjustment, a limit switch to be actuated at one end of the machine stroke, circuit means disposed between said limit switch and said transmission means for controlling said transmission means to connect said other rheostat with said motor only when said one limit switch is actuated, and biasing means for returning said other rheostat to a given adjustment when said transmission means are disconnected.

9. For use with fabricating machinery having a reciprocating relative movement between tool and work piece, a feed control system comprising a feed motor, current supply means connected to said motor for providing energization therefor and having voltage-responsive control means for controlling said energization, a circuit having two adjustable rheostats and having a balanceable branch connected to said control means for providing said control means with reversible control voltage dependent in polarity and magnitude upon the departure of said rheostats from a given adjustment relative to each other, selector means for adjusting one of said rheostats in accordance with desired amounts of feed, transmission means for connecting said other rheostat with said motor so as to cause said other rheostat to be adjusted in the direction required to establish said given relative adjustment, a control circuit disposed for controlling said transmission means, two limit switches to be actuated at the respective ends of the reciprocating travel, a selector switch attached to said control circuit and to said limit switches for selectively connecting said control circuit with one of said respective limit switches so that said transmission is caused to connect said other rheostat with said motor only when the selected limit switch is actuated, and biasing means for returning said other rheostat to a given adjustment when said transmission means are disconnected.

GEORGE E. KING.

REFERENCES CITED

The following references are of record in the file of this patent:

UNITED STATES PATENTS

| Number | Name | Date |
| --- | --- | --- |
| 2,032,598 | Shaw | Mar. 3, 1936 |
| 2,368,408 | Brooking | Jan. 30, 1945 |
| 2,417,784 | Schaelchlin et al. | Mar. 18, 1947 |